(12) United States Patent
Rall et al.

(10) Patent No.: US 11,108,658 B2
(45) Date of Patent: Aug. 31, 2021

(54) METHOD FOR DETECTING DATA, METHOD FOR UPDATING A SCENARIO CATALOG, A DEVICE, A COMPUTER PROGRAM AND A MACHINE-READABLE MEMORY MEDIUM

(71) Applicant: Robert Bosch GmbH, Stuttgart (DE)

(72) Inventors: Astrid Rall, Leingarten (DE); Andreas Heyl, Sunnyvale, CA (US); Markus Schweizer, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 172 days.

(21) Appl. No.: 15/889,299

(22) Filed: Feb. 6, 2018

(65) Prior Publication Data
US 2018/0227197 A1  Aug. 9, 2018

(30) Foreign Application Priority Data
Feb. 6, 2017  (DE) .......................... 102017201804.6

(51) Int. Cl.
*H04L 12/26* (2006.01)
*B60W 30/00* (2006.01)
*H04L 29/08* (2006.01)

(52) U.S. Cl.
CPC .............. *H04L 43/04* (2013.01); *B60W 30/00* (2013.01); *H04L 67/1097* (2013.01)

(58) Field of Classification Search
CPC ........... H04W 4/70; H04W 4/38; H04W 4/40; H04L 67/025; H04L 2209/80;
(Continued)

(56) References Cited

U.S. PATENT DOCUMENTS 5,974,235 A * 10/1999 Nunally ........... G08B 13/19604
709/202
9,189,897 B1 * 11/2015 Stenneth ................. G07C 5/008
(Continued)

OTHER PUBLICATIONS

Ebner, Adrian: "Reference Scenarios as a Basis for the Development and Evaluation of Active Safety Systems [Referenzszenarien als Grundlage für die Entwicklung and Bewertung von Systemen der Aktiven Sicherheit" (Dissertation), Berlin 2014, pp. 1-216.
(Continued)

*Primary Examiner* — Kevin T Bates
*Assistant Examiner* — Ranjan Pant
(74) *Attorney, Agent, or Firm* — Norton Rose Fulbright US LLP; Gerard A. Messina

(57) ABSTRACT

A method for detecting data of a vehicle operated at least partially in an automated manner, including at least one sensor, in particular, a surroundings sensor, in particular, a video sensor, a radar sensor, a LIDAR sensor, an ultrasonic sensor, an infrared sensor, and/or a GNSS sensor, in particular, for receiving a GPS signal, a GLONASS signal or a Galileo signal, and/or a vehicle sensor, in particular, for engine control, for activating occupant protection means, for activating assistance functions and/or convenience functions, in particular, an acceleration sensor, a rotation rate sensor, a pressure sensor, and at least one memory, in particular, a ring memory, including detecting data of the at least one sensor; saving the data in the memory, in particular, in the ring memory; detecting an event; initially storing the content of the memory, in particular, of the ring memory, at the point in time of the detected event.

19 Claims, 2 Drawing Sheets

(58) Field of Classification Search
CPC . H04L 63/1425; H04L 43/04; H04L 67/1097; G06F 21/554; G06F 21/552; B60W 30/00; B60R 16/0231; G08G 1/0968
See application file for complete search history.

(56) References Cited

U.S. PATENT DOCUMENTS

| | | | | |
|---|---|---|---|---|
| 2003/0080878 A1* | 5/2003 | Kirmuss | ................ | B60R 11/02 340/936 |
| 2007/0050109 A1* | 3/2007 | Ozawa | ................... | G07C 5/085 701/33.4 |
| 2010/0023208 A1* | 1/2010 | Fukushima | ............ | G07C 5/085 701/32.2 |
| 2010/0231718 A1* | 9/2010 | Nakamori | .......... | G06K 9/00798 348/148 |
| 2011/0130111 A1* | 6/2011 | Crandall | ............... | B60R 21/013 455/404.1 |
| 2012/0143394 A1* | 6/2012 | Tollkuehn | ................ | H04Q 9/00 701/1 |
| 2013/0245876 A1* | 9/2013 | Messerschmidt | ......... | B60L 5/04 701/22 |
| 2013/0321167 A1* | 12/2013 | Kohn | ........................ | G06F 5/10 340/870.01 |
| 2015/0051751 A1* | 2/2015 | Kirschbaum | ......... | B60W 40/12 701/1 |
| 2015/0331422 A1* | 11/2015 | Hartung | ................. | G05D 1/021 701/23 |
| 2016/0026180 A1* | 1/2016 | Tsimhoni | .............. | B60W 30/00 701/23 |
| 2016/0178464 A1* | 6/2016 | Burns | ....................... | F02C 3/10 73/112.01 |
| 2016/0364921 A1* | 12/2016 | Iyoda | ..................... | G07C 5/008 |
| 2016/0378112 A1* | 12/2016 | Ljubuncic | ............. | B60W 30/16 701/45 |
| 2018/0053356 A1* | 2/2018 | Bandy | ...................... | H04Q 9/04 |
| 2018/0079429 A1* | 3/2018 | Prokhorov | ............ | H04B 1/385 |

OTHER PUBLICATIONS

Situations Catalog VDA 702 (2015), Verband der Automobilindustrie e.V., Berlin, pp. 1-11.

Winner and Wachenfeld: "Decuring Autonomous Driving", (2013), presentation, Technische Universitat Darmstadt, pp. 1-35.

Spanfelner et al., "Challenges in applying the ISO 26262 for driver assistance systems," TÜV-Tagung Fahrassistenzsysteme FAS [TÜV Conference Driver Assistance Systems DAS], 2012.

* cited by examiner

METHOD FOR DETECTING DATA, METHOD FOR UPDATING A SCENARIO CATALOG, A DEVICE, A COMPUTER PROGRAM AND A MACHINE-READABLE MEMORY MEDIUM

CROSS REFERENCE

The present application claims the benefit under 35 U.S.C. § 119 of German Patent Application No. DE 102017201804.6 filed on Feb. 6, 2017, which is expressly incorporated herein by reference in its entirety.

FIELD

The present invention relates to a method for detecting data in a vehicle, a method for updating a scenario catalog for validating driver assistance functions for a vehicle or functions for the at least partially automated operation of a vehicle, as well as corresponding devices, a computer program and machine-readable memory media.

BACKGROUND INFORMATION

A scenario catalog describes driving situations, in which the vehicle, including driver/passengers and, optionally, maintenance personnel may be involved during operation of the vehicle, which are representative of a large part of the real traffic situation.

VDA 702 situation catalog E-parameters according to ISO 26262-3, the driving situation catalog of the Verband der Automobilindustrie e.V. (VDA) [German automobile industry association] is an example of a scenario catalog.

A. Ebner, "Referenzszenarien als Grundlage für die Entwicklung and Bewertung von Systemen der Aktiven Sicherheit [Reference Scenarios as a Basis for the Development and Evaluation of Active Safety Systems]" (Dissertation), Munich: TU Munich; 2014, also addresses scenario catalogs.

There is still no generally accepted approach for validating functions of driver assistance systems and of systems for the at least partially automated operation of a vehicle.

One problem in this regard is that models, in particular, in the field of object detection and surroundings detection and for situation analysis are not always error-free and complete.

If, for example, an object crosses the path of a vehicle, an emergency brake assistant must decide whether the object is a human and initiate suitable protective measures, if necessary, a full brake application.

In the case of other objects, for example, of a drifting plastic bag, on the other hand, a full brake application should not be carried out at all since this could result in serious rear-end collision accidents.

Algorithms for object detection, i.e., in this case, for distinguishing between objects that require a suitable protective measure and objects that may require no protective measure, are in principle error-prone. This is addressed by the term "functional inadequacy" according to Spanfelner et al., "Challenges in applying the ISO 26262 for driver assistance systems," TÜV-Tagung Fahrassistenzsysteme FAS [TÜV Conference Driver Assistance Systems DAS], 2012.

The ISO 26262 addresses the topic "functional safety" in the automotive field for electrical and electronic systems. "Functional inadequacies" of the aforementioned kind are not included within the scope of application of this standard, for one thing, because the potential errors are not electrical or electronic in nature, and for another, because the ISO 26262 does not consider the case that functional relationships may be incomplete or imprecise.

Therefore, one approach is to derive target figures for error rates for a validation from accident figures and in the process to require that driving with driver assistance systems or the at least partially automated operation of a vehicle should result in a lower number of accidents than that caused by "normal, human" driving.

However, quantities of data from driving tests that would be necessary for verifying these target figures could only be ascertained over a period of several hundred years.

SUMMARY

In accordance with the present invention, new functions are allowed to passively run concurrently in series-production vehicles, but are not activated. This method is called "Trojan Horse," according to Hermann Winner et al., "Absicherung automatischen Fahrens," FAS Tagung ["Safeguarding automatic driving," FAS Conference], Munich, 2013. With this method, it is possible to read out parallel measured values in various series-production vehicles and to analyze how the passively concurrently running function behaves. In this way, the data volume required for a validation are obtained relatively quickly.

However, in many cases, it is difficult to assess the data, because the function to be validated is not active, thus, its behavior does not correspond to reality. Accordingly, this raises the question: How can it be subsequently assessed whether an activated driver assistance function for lane keeping (lane-keeping assistant) would have actually kept the vehicle essentially in the middle of the lane?

Another approach is to test object formation and situation analysis offline and to validate based on a scenario catalog. This method is called "Open Loop" according to Hermann Winner et al., "Absicherung automatischen Fahrens," FAS Tagung "Safeguarding automatic driving," FAS Conference, Munich, 2013. With this method, the validation is separated as follows:

Examination of the statistics via a scenario catalog. The scenario catalog could, for example, supply the following information: How often do people run in front of a moving car? What do they look like? What characteristics do they have? How do they move? How often are other objects located in front of vehicles? What characteristics do they have?
  Corresponding offline test: How often does an algorithm to be assessed make incorrect decisions in such situations?

In this case, creating a scenario catalog including real probabilities and the corresponding preferably real scenarios is the greatest challenge.

The present invention is based on the combination of the "Trojan Horse" and "Open-Loop" approaches for improving the scenario catalog.

Against this background, a method is described here for detecting data of a vehicle, including at least one sensor and at least one memory. The method includes the following steps:
  detecting data of the at least one sensor;
  saving the data in the memory;
  detecting an event;
  initial storing of the content of the memory at the point in time of the detected event.

The use of a ring memory as a memory has proven particularly suitable. The advantages of this method of the present invention may be especially evident, in particular, in the use of a ring memory or of a memory having an equivalent functionality, namely the temporary storing of data for a period of time predefined by the operating capacity of the memory.

The advantage of this method is that instead of enormous amounts of data, which would result, for example, during a permanent storing of all data, only the data relevant for a validation are stored for the purpose of evaluation.

As a result, time and costs may be saved in the development of new functions for driver assistance systems or for systems for the at least partially automated operation of a vehicle.

The method is able to display its advantages, in particular, if it runs in series-production vehicles in parallel with the previously enabled functions.

An event according to the present invention is understood to mean a process, which is classified as significant. Significant within the context of the present invention is, for example, the overruling by the driver of the vehicle of a control carried out at least partially in an automated manner. This is significant here, since the function carried out at least partially in an automated manner apparently made an incorrect decision. It is also conceivable, however, to view the activation of an emergency brake function as a significant event.

It is understood that the number of relevant processes is varied. At the same time, it is understood that those skilled in the art in this field are aware of which processes are significant without the need to list these processes in detail here.

A storing according to the present invention is understood to mean a process, in which the detected data are saved in a memory in such a way that they may be used for a later analysis for validating a driver assistance function or for validating a function for the at least partially automated operation of a vehicle. This storing is meant to be understood, in particular, as distinguished from the saving in a ring memory, in which the data are typically available for a maximum of only one cycle time of the ring memory or, depending on the implementation of the ring memory and when employed in a vehicle, are deleted after the vehicle is parked or with the next start-up of the vehicle.

The method has proven to be particularly advantageous in conjunction with vehicles that are operated at least partially in an automated manner.

Sensors according to the present invention include, for example, surroundings sensors. Surroundings sensors are sensors, which are suitable for and configured to detect the surroundings of a vehicle. These are, among others, video sensors, radar sensors, LIDAR sensors, ultrasonic sensors, infrared sensors. For the present invention, this also includes sensors for satellite navigation, so-called GNSS sensors. These are, among others, sensors for receiving signals of the GPS system, the GLONASS system or the Galileo system, for example. For the present invention, this also includes vehicle sensors. Vehicle sensors are understood in the present case to mean sensors that are necessary or suitable for operating the vehicle or also for providing convenience functions. These are, among others, sensors for engine control, for activating occupant protection devices, for activating assistance functions and/or convenience functions, for example. Specifically, these could be, among others, acceleration sensors, rotation rate sensors or pressure sensors, for example.

According to one specific embodiment of the method according to the present invention, the method includes the additional step of the second storing of the content of the ring memory after one cycle time subsequent to the point in time of the detected event.

This specific embodiment presupposes a ring memory having one cycle time. The cycle time is the time that elapses until an arbitrary piece of data is overwritten with a new piece of data, i.e., the time that elapses until the ring memory has been filled once with written data. Ring memories that are routinely written with data typically have a fixed cycle time.

This specific embodiment has the additional advantage that not only the data, i.e., the situation detected by the sensors, are stored prior to the event for evaluation and validation, but also for a certain time after the event. This results in a more precise analysis and a more rapid validation of the functions to be validated.

According to one specific embodiment of the method according to the present invention, the data are stored, in the steps of storing, in a cloud memory.

A cloud memory is understood in the present case to mean a memory that is provided via a network, without the memory having to be present locally in the vehicle. The Internet advantageously lends itself as a network via which the memory is provided.

The detected data, by storing them in a cloud memory, are more quickly available centrally. If, by comparison, the data were saved in the vehicle itself, the data to be analyzed and validated would initially have to be read out. The question of how would then arise. This may be advantageously circumvented by storing in a cloud memory.

According to one specific embodiment of the method according to the present invention, an event is detected if an action carried out in an automated manner is overruled and/or altered by a manual intervention of the driver of the vehicle.

Another aspect of the present invention is a method for updating a scenario catalog. The method includes the following steps:

receiving a plurality of data of at least one vehicle, in particular, detected according to a method according to the present invention;

ascertaining the probability of the occurrence of the detected event as a function of the detected data;

updating the scenario catalog with the aid of the ascertained probability and the detected event.

Another aspect of the present invention is a computer program, which is configured to carry out all steps of the example method.

Another aspect of the present invention is a machine-readable memory medium, on which the computer program according to the present invention is stored.

Another aspect of the present invention is a device, which is configured to carry out all steps of one of the methods of the present invention.

BRIEF DESCRIPTION OF THE DRAWINGS

Specific embodiments of the present invention are depicted and explained below with reference to the figures.

DETAILED DESCRIPTION OF EXAMPLE EMBODIMENTS

Figure 1:
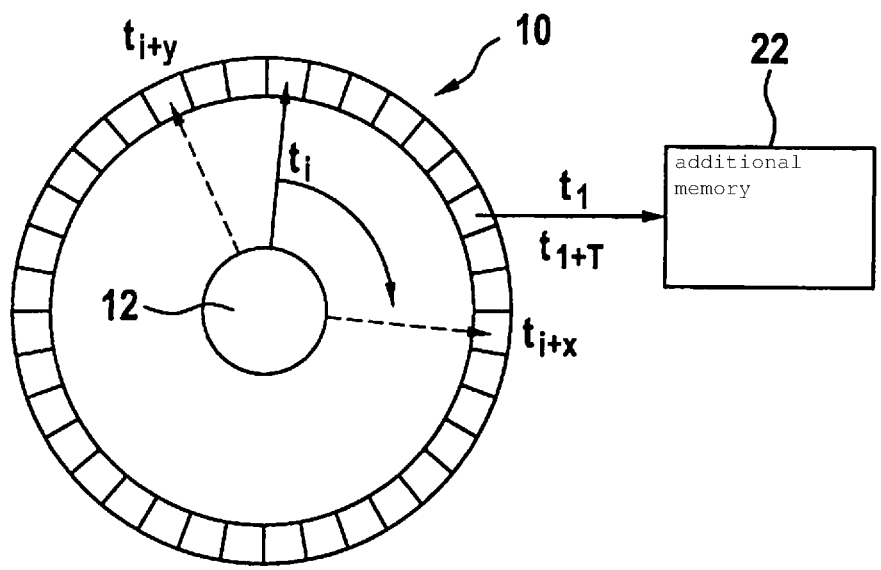
FIG. 1 schematically shows a depiction of a ring memory according to the present invention.

FIG. 1 schematically shows a depiction of a ring memory 10 according to the present invention. Ring memory 10 includes a number of memory spaces, schematically shown in FIG. 1 by the segments around the edge of circularly depicted ring memory 10. The memory spaces are iteratively written in cycles. Once one memory space is written at point in time $t_i$, the next memory space of ring memory 10 is written at subsequent point in time $t_{i+1}$. In this way, the memory spaces of ring memory 10 are written progressively over time. If, after a cycle time T, all memory spaces are written, the first memory space again follows on the last memory space and, in this way, the piece of data in this memory space is overwritten with the updated piece of data.

This is depicted in FIG. 1 by the solid circular arrow. The dashed arrows are meant to indicate that data have already been stored before point in time $t_i$, for example, at point in time $t_{i-y}$, and that data are stored after point in time $t_i$, for example, at point in time $t_{i-x}$.

Thus, a ring memory always maximally includes the data of the elapsed cycle time T.

Cycle time T in this case is a function at least of the capacity of the ring memory, as well as of the frequency of the data that are saved in the ring memory. The cycle time may be easily calculated if the data to be saved are provided at a fixed frequency.

According to the present invention, when an event is detected at point in time $t_1$, updated content 12 of ring memory 10 is transferred to an additional memory 22, which is not cyclically overwritten.

In one advantageous embodiment, this additional memory 22 is a cloud memory, i.e., a memory which is provided via a network without the memory having to be present locally in the vehicle.

The Internet, for example, advantageously lends itself as a network via which the memory is provided.

Thus, at point in time $t_i$ of the event, the data of the time period up to one cycle time T before event $t_i$ are located in a second memory 22. These data may be utilized in order to understand how the detected event was able to come about.

In another embodiment of the present invention, the additional data are also transferred into additional memory 22 after the detected event. This may take place continuously after the detection of the event, i.e., so that the new data are transferred both into ring memory 10 as well as into additional memory 22.

However, this may also take place in blocks, for example, after a further cycle time T, i.e., at point in time $t_{1+T}$ as depicted in FIG. 1.

Figure 2:
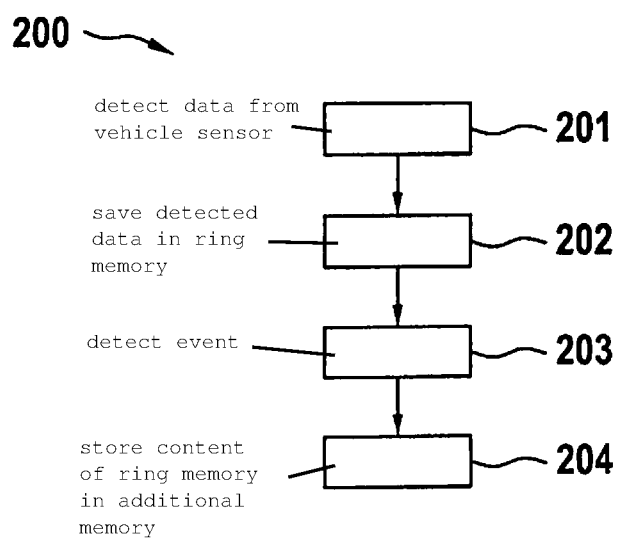
FIG. 2 shows a flow chart of one specific embodiment of the method of the present invention for detecting data.

FIG. 2 shows a flow chart of one specific embodiment of method 200 of the present invention.

Data from at least one vehicle sensor are detected in step 201.

Vehicle sensors in this case include surroundings sensors, for example. Surroundings sensors are sensors, which are suitable for and configured to detect the surroundings of a vehicle. These are, among others, video sensors, radar sensors, LIDAR sensors, ultrasonic sensors, infrared sensors, for example. For the present invention, these also include sensors for satellite navigation, so-called GNSS sensors. These are, among others, sensors for receiving signals of the GPS system, GLONASS system or Galileo system, for example. For the present invention, these also include vehicle sensors. Vehicle sensors in the present case are understood to mean sensors, which are necessary or suitable for operating the vehicle or also for providing convenience functions. These are, among others, sensors for engine control, for activating occupant protection means, for activating assistance functions and/or convenience functions, for example. Specifically, these could be, among others, acceleration sensors, rotation rate sensors or pressure sensors, for example, In step 202, the detected data are saved in a ring memory according to the present invention. The functionality of a general ring memory is understood by those skilled in the art. The specific functionality of ring memory 10 of the present invention is elucidated for the schematic depiction of the ring memory in FIG. 1.

In step 203, an event according to the present invention is detected.

An event according to the present invention is understood to mean a process, which is classified as significant. Significant within the context of the present invention is, for example, the overruling by the driver of the vehicle of a control carried out at least partially in an automated manner. This is significant here, since the function carried out at least partially in an automated manner apparently made an incorrect decision. It is also conceivable, however, to view the activation of an emergency brake function as a significant event.

In step 204, content 12 of ring memory 10 at point in time $t_1$ of the detection of the event is stored in an additional memory 22.

Figure 3:
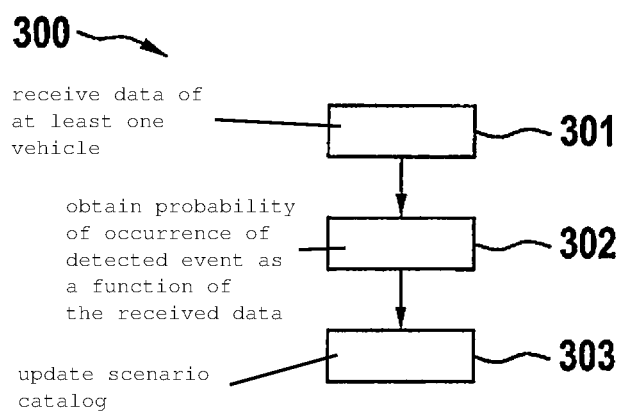
FIG. 3 shows a flow chart of one specific embodiment of the method of the present invention for updating a scenario catalog.

FIG. 3 shows a flow chart of one specific embodiment of the method of the present invention for updating a scenario catalog.

In step 301, data of at least one vehicle are received as a result of an event detected in the vehicle. The data are preferably detected according to a method for detecting data according to the present invention. The step of receiving may take place according to the present invention with the aid of a receiving device of a cloud memory. The technologies of the Internet have proven suitable for transmitting and for receiving. In step 302, the probability of the occurrence of the detected event is ascertained as a function of the received data. The step of ascertaining in the present case may take place within a memory, or within the cloud memory or via an ascertainment device, which may make use of the data saved in the cloud memory. For this purpose, a corresponding data processing center has proven suitable. By utilizing the data that are essentially centrally saved in a cloud memory, it is possible to easily apply evaluation algorithms such as, for example, pattern recognition algorithms, algorithms of artificial intelligence, for example, the so-called deep-learning methods.

In step 303, the scenario catalog is updated with the aid of the ascertained probability and of the detected event.

Once the probabilities of the occurrence of the detected event or detected events have been ascertained in the preceding steps, thus, after the evaluation of the data in the cloud memory, the scenario catalog may be updated. Updating in the present case may be understood to mean updating assignments of occurrence probabilities to events, adding new assignments of events to occurrence probabilities, or to also substantiate and thereby divide events into additional events or to provide sub-events with correspondingly adapted events. The assignment of events to occurrence probabilities in this case may take place in tuples and may be stored in table-based databases. It is also possible, however for the assignments to be stored and/or provided in another form suitable to the respective application.

What is claimed is:

1. A method for detecting data of a vehicle operated at least partially in an automated manner, the vehicle including at least one sensor and a ring memory, the method comprising:
   detecting data of the at least one sensor;
   saving the detected data in the ring memory, such that, after the ring memory is initially filled, each subsequent new data element of the detected data overwrites a respective earliest saved data element of the detected data that was previously saved in the ring memory;
   detecting an event, wherein the event is an occurrence of a manual intervention by a driver of the vehicle that overrules or alters an action carried out by the vehicle in an automated manner; and
   responsive to the detection of the event, transferring of all of the detected data that, due to the previous saving, fills an entirety the ring memory at a point in time of the detected event.

2. The method as recited in claim 1, wherein the ring memory has a cycle time in which an entirety of the ring memory fills with the detected data, and wherein the method further comprises, responsive to the detection of the event, a second transferring of all of the detected data after passage of the cycle time subsequent to the point in time of the detected event.

3. The method as recited in claim 1, wherein the transferring is to a cloud memory.

4. The method as recited in claim 1, wherein the at least one sensor includes a surroundings sensor of the vehicle.

5. The method as recited in claim 1, wherein the at least one sensor includes a video sensor, a radar sensor, a LIDAR sensor, an ultrasonic sensor, an infrared sensor, a GNSS sensor for receiving a GPS signal, a GLONASS signal, and/or a Galileo signal.

6. The method as recited in claim 1, wherein the at least one sensor includes a vehicle sensor for engine control, a vehicle sensor for activating occupant protection devices, a vehicle sensor for activating assistance functions, a vehicle sensor for convenience functions, an acceleration sensor, a rotation rate sensor, and/or a pressure sensor.

7. The method as recited in claim 1, wherein, based on the transferring, the action is not carried out in the automated manner in a different vehicle than the vehicle in which the manual intervention occurs.

8. A method for updating a scenario catalog, comprising:
   responsive to a detection of an event of a vehicle, obtaining all detected sensor data of the vehicle that, due to a previous saving of the detected sensor data, fills an entirety of a ring memory, wherein the ring memory is operated such that, after the ring memory is initially filled, each subsequent new data element of the detected data overwrites a respective earliest saved data element of the detected data that was previously saved in the ring memory, wherein the event is an occurrence of a manual intervention by a driver of the vehicle that overrules or alters an action carried out by the vehicle in an automated manner;
   ascertaining a probability of an occurrence of the detected event as a function of the obtained data; and
   updating the scenario catalog using the ascertained probability and the detected event.

9. The method as recited in claim 8, wherein based on the updating, the automated action is not performed in a different vehicle than the vehicle in which the manual intervention occurs.

10. The method as recited in claim 8, wherein:
   the ring memory has a cycle time in which an entirety of the ring memory fills with the detected sensor data; and
   the method further comprises, responsive to the detection of the event, obtaining all further detected sensor data of the vehicle that fills the entirety of the ring memory after passage of the cycle time subsequent to the point in time of the detected event.

11. A non-transitory machine readable memory medium on which is stored a computer program for detecting data of a vehicle operated at least partially in an automated manner, the vehicle including at least one sensor and a ring memory, wherein the computer program is executable by a processor and, when executed by the processor, causes the processor to perform the following:
   detecting data of the at least one sensor;
   saving the detected data in the ring memory, such that, after the ring memory is initially filled, each subsequent new data element of the detected data overwrites a respective earliest saved data element of the detected data that was previously saved in the ring memory;
   detecting an event, wherein the event is an occurrence of a manual intervention by a driver of the vehicle that overrules or alters an action carried out by the vehicle in an automated manner; and
   responsive to the detection of the event, transferring of all of the detected data that, due to the previous saving, fills an entirety of the ring memory at a point in time of the detected event.

12. The non-transitory machine readable memory medium as recited in claim 11, wherein:
   the ring memory has a cycle time in which an entirety of the ring memory fills with the detected data; and
   the computer program, when executed by the processor, causes the processor to perform, responsive to the detection of the event, a second transferring of all of the detected data after passage of the cycle time subsequent to the point in time of the detected event.

13. The non-transitory machine readable memory medium as recited in claim 11, wherein, based on the transferring, the action is not carried out in the automated manner in a different vehicle than the vehicle in which the manual intervention occurs.

14. A device for detecting data of a vehicle that is operated at least partially in an automated manner and that includes at least one sensor, the device comprising:
   a processor; and
   a ring memory, wherein the processor is configured to:
      obtain detected data of the at least one sensor;
      save the detected data in the ring memory, such that, after the ring memory is initially filled, each subsequent new data element of the detected data overwrites a respective earliest saved data element of the detected data that was previously saved in the ring memory; and
      in response to a detection of an event, transfer of all of the detected data that, due to the previous saving, fills an entirety of the ring memory at a point in time of the detected event, wherein the event is an occurrence of a manual intervention by a driver of the vehicle that overrules or alters an action carried out by the vehicle in an automated manner.

15. The device as recited in claim 14, wherein the at least one sensor includes a surroundings sensor of the vehicle.

16. The device as recited in claim 14, wherein the at least one sensor includes a video sensor, a radar sensor, a LIDAR sensor, an ultrasonic sensor, an infrared sensor, a GNSS sensor for receiving a GPS signal, a GLONASS signal, and/or a Galileo signal.

17. The device as recited in claim 14, wherein the at least one sensor includes a vehicle sensor for engine control, a vehicle sensor for activating occupant protection devices, a vehicle sensor for activating assistance functions, a vehicle sensor for convenience functions, an acceleration sensor, a rotation rate sensor, and/or a pressure sensor.

18. The device as recited in claim 14, wherein:
   the ring memory has a cycle time in which an entirety of the ring memory fills with the detected data; and
   the processor is further configured to, in response to the detection of the event, perform a second transfer of all of the detected data after passage of the cycle time subsequent to the point in time of the detected event.

19. The device as recited in claim 14, wherein, based on the transfer, the action is not carried out in the automated manner in a different vehicle than the vehicle in which the manual intervention occurs.

* * * * *